United States Patent
Ikegami et al.

(10) Patent No.: US 6,456,400 B1
(45) Date of Patent: *Sep. 24, 2002

(54) DATA COMMUNICATION APPARATUS, METHOD AND SYSTEM

(75) Inventors: Itaru Ikegami, Kawasaki (JP); Masaya Kondo, Yokohama (JP); Akemi Nishimaki, Yokohama (JP); Atsushi Ikeda, Tokorozawa (JP); Shinji Todaka, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/423,168

(22) Filed: Apr. 17, 1995

(30) Foreign Application Priority Data

| Apr. 18, 1994 | (JP) | 6-078633 |
| Apr. 18, 1994 | (JP) | 6-078634 |
| Mar. 6, 1995 | (JP) | 7-045436 |

(51) Int. Cl.[7] .................................................. H04N 1/00
(52) U.S. Cl. ...................... 358/434; 358/405; 358/406; 358/438; 358/449
(58) Field of Search ................................ 358/400, 404, 358/405, 406, 407, 434, 435, 436, 438, 442, 443, 445, 449, 451, 468, 474; 379/100; 395/114

(56) References Cited

U.S. PATENT DOCUMENTS

| 5,003,583 | A | | 3/1991 | Iggulden et al. ............ 379/100 |
| 5,027,421 | A | * | 6/1991 | Kanno ............................ 382/47 |
| 5,291,302 | A | * | 3/1994 | Gordon et al. ............... 358/405 |
| 5,428,458 | A | * | 6/1995 | Aiba et al. ................... 358/434 |
| 5,724,355 | A | * | 3/1998 | Bruno ........................... 370/401 |
| 6,049,597 | A | * | 4/2000 | Satake ....................... 379/93.08 |
| 6,091,515 | A | * | 7/2000 | Kimura ....................... 358/434 |
| 6,161,143 | A | * | 12/2000 | Tayama ....................... 709/238 |

FOREIGN PATENT DOCUMENTS

| EP | 0081362 | * | 6/1983 | ............ H04N/1/32 |
| EP | A-0364264 | | 4/1990 | ............ H04N/1/32 |
| EP | 0796001 A2 | * | 9/1997 | ............ H04N/1/32 |
| JP | 0096452 | * | 6/1983 | ................ 358/438 |

* cited by examiner

Primary Examiner—Jerome Grant, II
(74) Attorney, Agent, or Firm—Morgan & Finnegan, L.L.P.

(57) ABSTRACT

A data communication apparatus such as a facsimile is constructed by a communication unit to transmit and receive data, an output unit such as a printer to output the data received by the communication unit, and a connection unit such as an LAN to connect one or more external apparatuses. Data of an output-capable ability of the output unit and data of an output-capable ability of the external apparatus connected through the connection unit are notified to a communication apparatus on the partner side by the communication unit. The ability data indicates an image size and a resolution of image data that can be outputted by the output unit and/or the external apparatus. The data communication apparatus also has a transfer unit to transfer the data received by the communication unit to the external apparatus connected to the LAN. When the image size and resolution of the received image data exceed the output-capable ability of the output unit, the transfer unit transfers the received data. When the data is transferred by the transfer unit, such a fact is notified to the user.

26 Claims, 15 Drawing Sheets

FIG. 8

| APPARATUS NUMBER | ADDRESS | IMAGE SIZE | RESOLUTION | COLOR |
|---|---|---|---|---|
| 00 | 00 | A4 | NORMAL | COLOR |
| 01 | 111 | A4, A3 | NORMAL, FINE | MONOCHROME |
| 02 | 112 | A4 | NORMAL | MONOCHROME |
| 03 | 113 | A4 | NORMAL | COLOR |
| ... | | | | |

FIG. 9

| |
|---|
| FILE NUMBER ~901 |
| PARTNER'S NUMBER ~902 |
| THE NUMBER OF PAGES ~903 |
| IMAGE SIZE ~904 |
| RESOLUTION ~905 |
| COLOR ~906 |
| IMAGE ADDRESS ~907 |

FIG. 12

| APPARATUS NUMBER | ADDRESS | IMAGE SIZE | RESOLUTION | COLOR |
|---|---|---|---|---|
| 00 | 00 | A4 | NORMAL | MONOCHROME |
| 01 | 111 | A4, A3 | NORMAL, FINE | MONOCHROME |
| 02 | 112 | A4 | NORMAL | MONOCHROME |
| 03 | 113 | A4 | NORMAL | COLOR |

[UP] [DOWN]   [CANCEL] [OK]

DATA COMMUNICATION APPARATUS, METHOD AND SYSTEM

BACKGROUND OF THE INVENTION

1. Field of the Invention

The invention relates to data communication apparatus, method, and system for performing a data communication.

2. Related Background Art

In recent years, an integration of office equipment has progressed and an opportunity such that a data communication apparatus such as a facsimile apparatus or the like is connected onto a network such as a local area network (LAN) or the like and is used is increasing. In the facsimile apparatus or the like, hitherto, a recording ability of a recording unit which the own apparatus has is notified to the partner side.

In the conventional apparatus, however, since the facsimile apparatus connected to the network notifies the recording ability of the recording unit which the own apparatus has to the transmission side, in the case where the transmission side tries to transmit image data of a large size or image data of a high resolution, it is necessary to perform a process such as image reduction or resolution conversion. That is, the transmission side reduces the image size or decreases the resolution in accordance with a recording ability of the recording unit which was notified from the reception side and, after that, transmits the image data. Therefore, there is a drawback such that only an image in which a picture quality deteriorated due to the reduction control or resolution conversion can be obtained on the reception side.

SUMMARY OF THE INVENTION

The invention is made to eliminate the above drawbacks and it is an object of the invention to provide data communication apparatus, method, and system in which even image data of an image size, resolution, or the like exceeding a recording ability possessed by a recording unit provided for a data communication apparatus on the reception side can be received at a high fidelity.

Another object of the invention is to provide data communication apparatus, method, and system which can receive image data without deteriorating a picture quality of the image data to be transmitted from the transmission side.

Still another object of the invention is to provide data communication apparatus, method, and system which can output image data without deteriorating a picture quality of the image data received.

Still another object of the invention is to provide data communication apparatus, method, and system in which image data received can be outputted by another equipment on an LAN.

Still another object of the invention is to provide data communication apparatus, method, and system in which in the case where received image data was transferred, a transfer destination side can be identified.

Still another object of the invention is to provide data communication apparatus, method, and system which can notify an output ability of an equipment on the LAN to a partner side.

Still another object of the invention is to provide data communication apparatus, method, and system in which received data can be outputted by a selected external apparatus.

Still another object of the invention is to provide data communication apparatus, method, and system in which even in the case where an external apparatus connected to the LAN is changed, it is possible to cope with such a case.

Still another object of the invention is to provide data communication apparatus, method, and system which can select whether transfer of image data to an external apparatus is permitted or not.

Still another object of the invention is to efficiently use an equipment on the LAN.

The above and other objects and features of the present invention will become apparent from the following description and the appended claims with reference to the accompanying drawings.

BRIEF DESCRIPTION OF THE DRAWINGS

FIG. 8 is a diagram showing an example of a format of a table showing an output ability of each apparatus in a network;

FIG. 9 is a diagram showing an example of an image control table format to control image data;

FIG. 12 is a diagram showing display contents of a display unit 107 when selecting an apparatus.

DETAILED DESCRIPTION OF THE PREFERRED EMBODIMENTS

An embodiment of the present invention will now be described in detail hereinbelow with reference to the drawings.

[First Embodiment]

Figure 1:
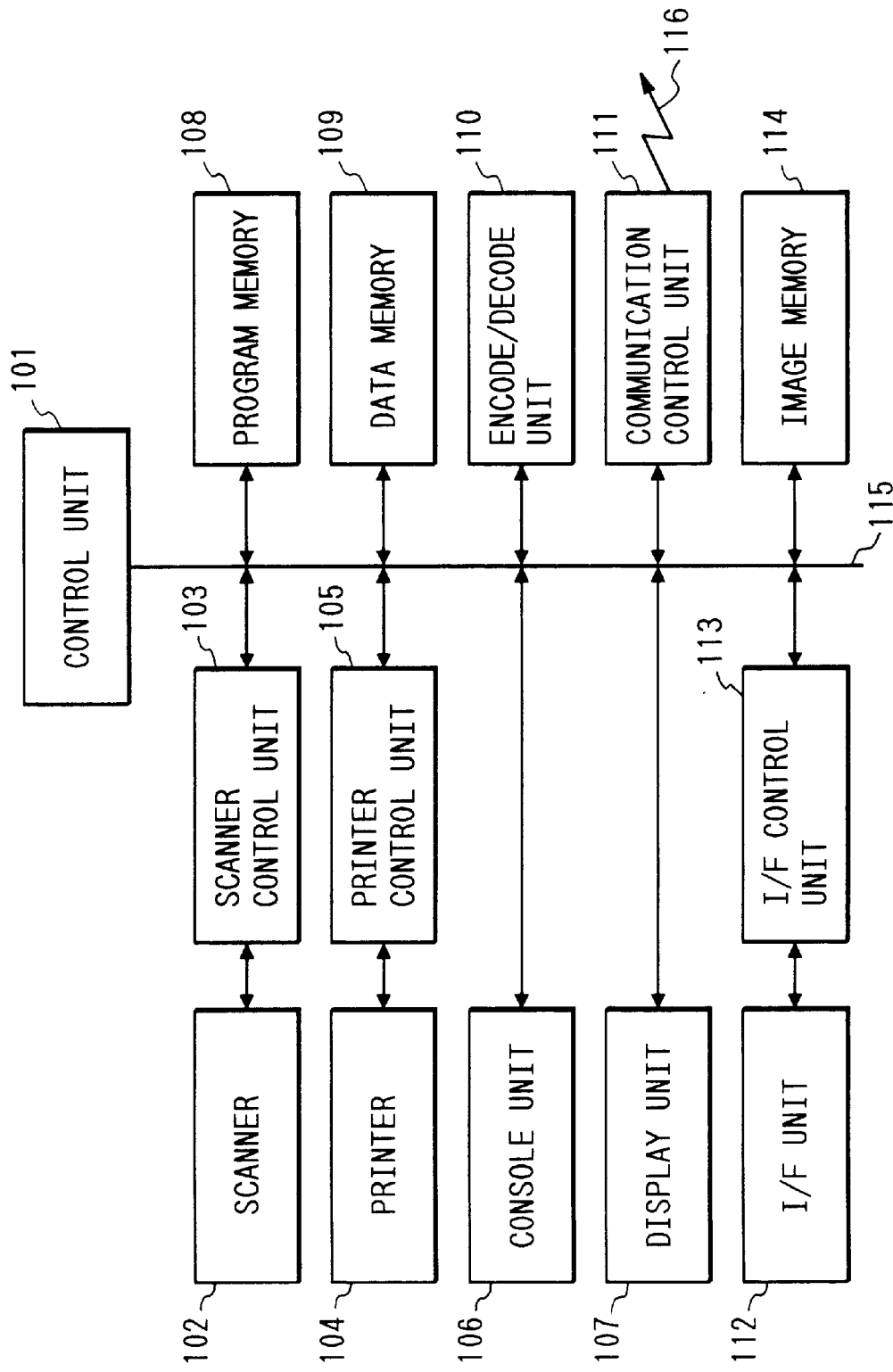
FIG. 1 is a block diagram showing a construction of a facsimile apparatus according to an embodiment of the invention.

FIG. 1 is a block diagram of a facsimile apparatus showing an example of an embodiment of the invention.

In FIG. 1, reference numeral 101 denotes a control unit to control a whole apparatus.

Reference numeral 102 denotes a scanner for reading an image.

Reference numeral 103 denotes a scanner control unit for controlling a scanner 102.

Reference numeral 104 denotes a printer to record an image read by the scanner 102 or an image received through a communication line 116, which will be explained hereinlater. In the embodiment, it is assumed that the maximum record-capable paper size is equal to A4 size and a pixel density is set to "Fine" (a pixel density in the main scan direction is set to 8 dots/mm and a pixel density in the sub scanning direction is set to 7.7 dots/mm).

Reference numeral 105 denotes a printer control unit for controlling the printer 104.

Reference numeral 106 denotes a console unit. When the operator depresses a proper key in the console unit 106, one of various kinds of operations corresponding to the depressed key is executed.

Reference numeral 107 denotes a display unit to display a state of the apparatus and various data such as request for the operation, and the like. The display unit 107 is of the touch panel type and various kinds of selections can be performed.

Reference numeral 108 denotes a program memory in which programs to execute a control of the apparatus and the like have been stored.

Reference numeral 109 denotes a data memory to store various kinds of data such as output-capable image size, reception ability such as a resolution or the like, and the like.

Reference numeral 110 denotes an encode/decode unit for encoding and decoding image data.

Reference numeral 111 denotes a communication control unit for controlling a transmission and reception of data through a communication line.

Reference numeral 112 denotes an interface (I/F) unit for connecting the present facsimile apparatus to the LAN. For example, there is an SCSI (Small Computer System Interface), a centronics interface, RS-232C, and the like.

The interface unit 112 can be also directly connected to a data processing terminal such as a personal computer or the like.

Reference numeral 113 denotes an interface control unit to control the interface unit 112.

Reference numeral 114 denotes an image memory for storing image data read by the scanner 102 or image data received through the I/F unit 112.

Reference numeral 115 denotes a bus to connect each of the above units.

Reference numeral 116 denotes a communication line. Various data is transmitted and received through the communication line 116.

Figure 2:
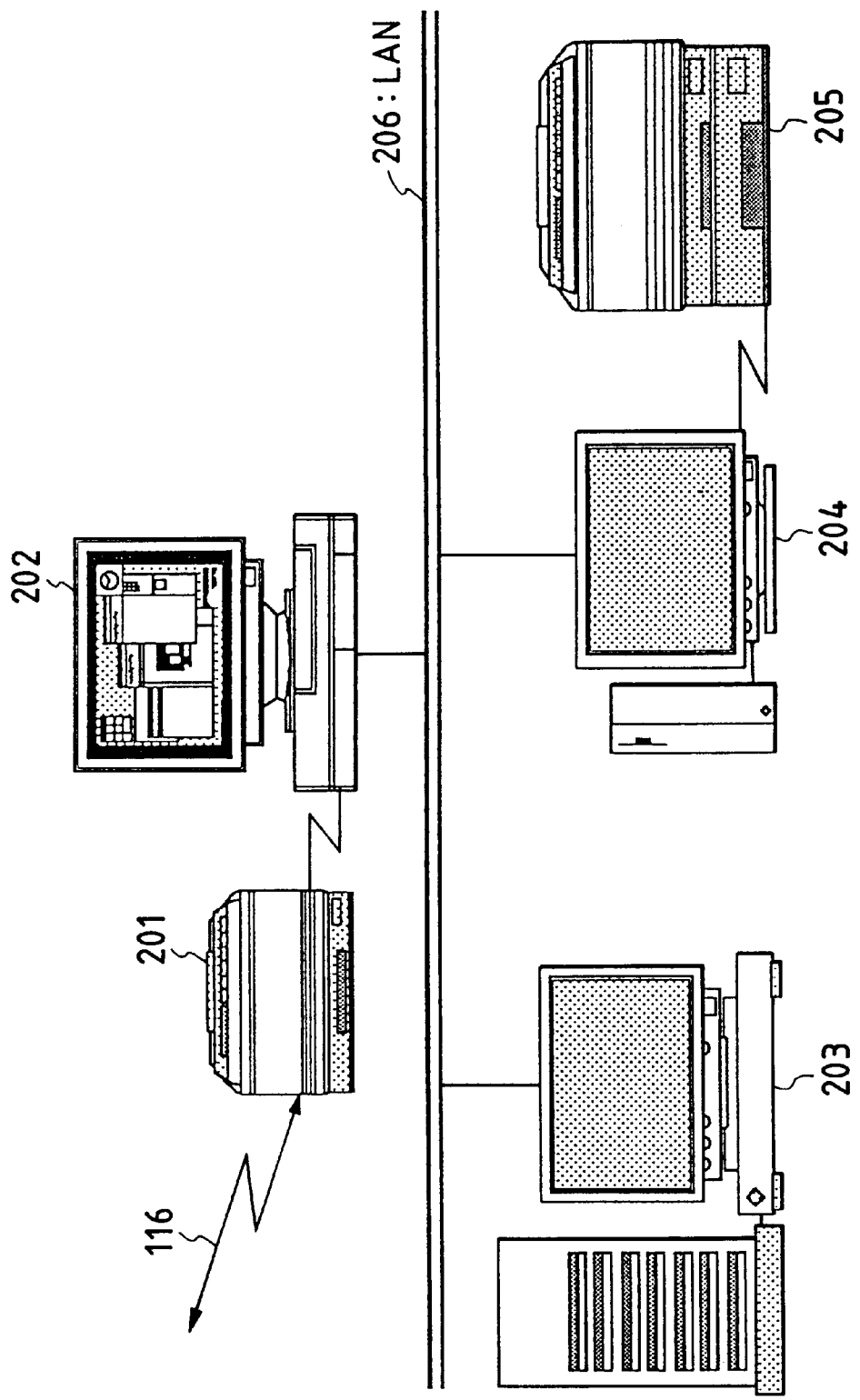
FIGS. 2, 5, and 15 are diagrams showing examples of a network construction in the embodiment of the invention.

FIG. 2 is a diagram showing an example of a construction of a network to which a facsimile apparatus according to the embodiment is connected through the I/F unit 112.

Reference numeral 201 denotes a facsimile apparatus in the embodiment for transmitting and receiving data via the communication line 116.

Reference numeral 202 denotes a data processing terminal such as a personal computer or the like which can process or edit image data by softwares installed therein. By changing the softwares, a processing ability of the image data is also changed.

The data processing terminal 202 and facsimile apparatus 201 are connected by a serial interface such as RS232C or the like. A driver software of the facsimile apparatus 201 has previously been installed in the data processing terminal 202. A communication control can be performed via the facsimile apparatus 201. Further, the facsimile apparatus 201 can obtain data on the LAN (Local Area Network) through the data processing terminal.

Reference numeral 203 denotes a server machine and is a computer for controlling the LAN. The server machine 203 is also a file server to control files on the LAN.

Reference numeral 204 denotes a printer server to perform a control for receiving print requests from various data processing terminals and outputting to a printer. Reference numeral 205 denotes a printer to output print image data. In the embodiment, it is assumed that the printer 205 can cope with the recording paper of the maximum A3 size and has a pixel density of 600 dpi.

Figure 3:
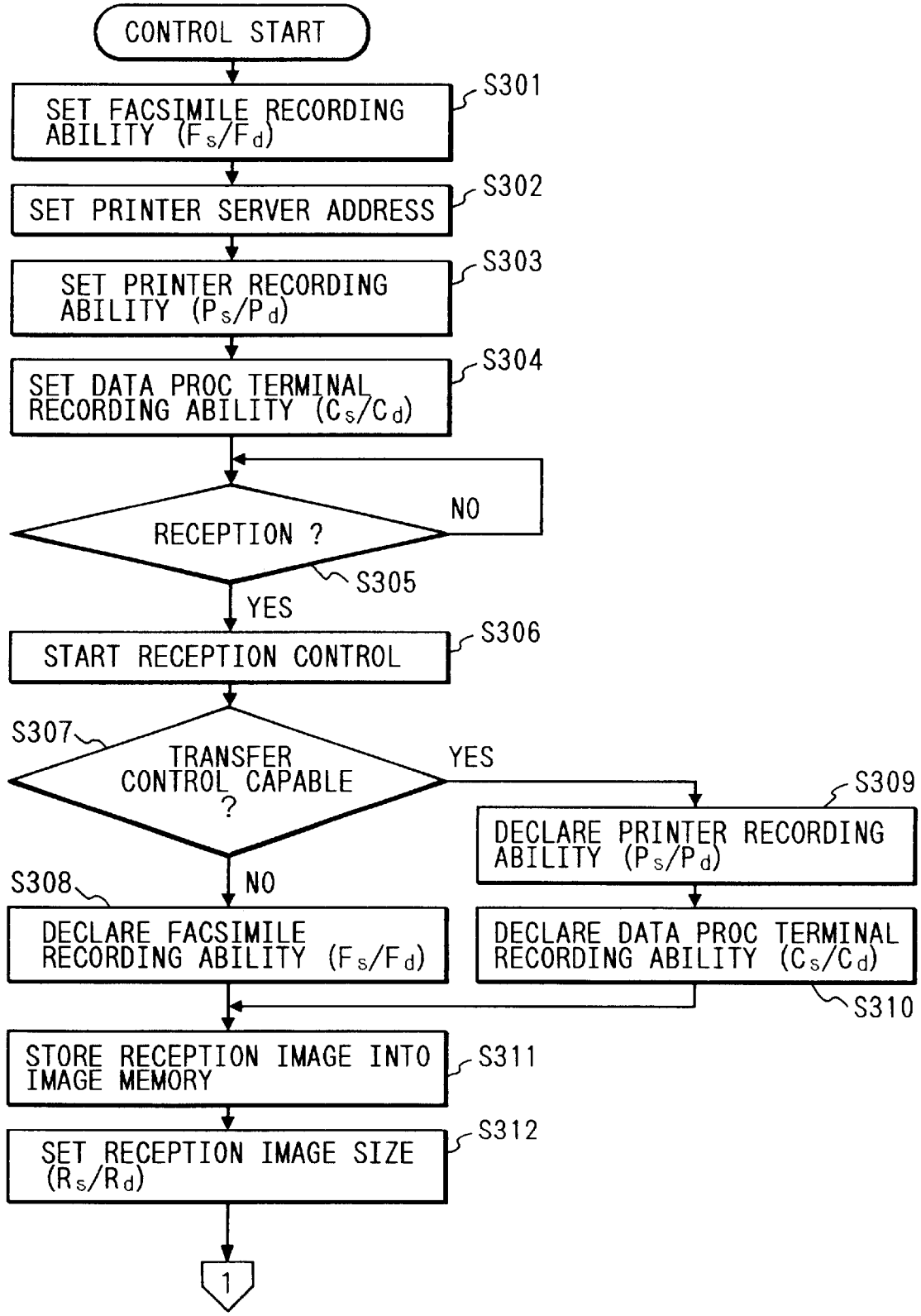
FIGS. 3, 4, 6, 7, 10, 11, 13, 16 are flowcharts showing flows of processes in the embodiment of the invention.
Figure 4:
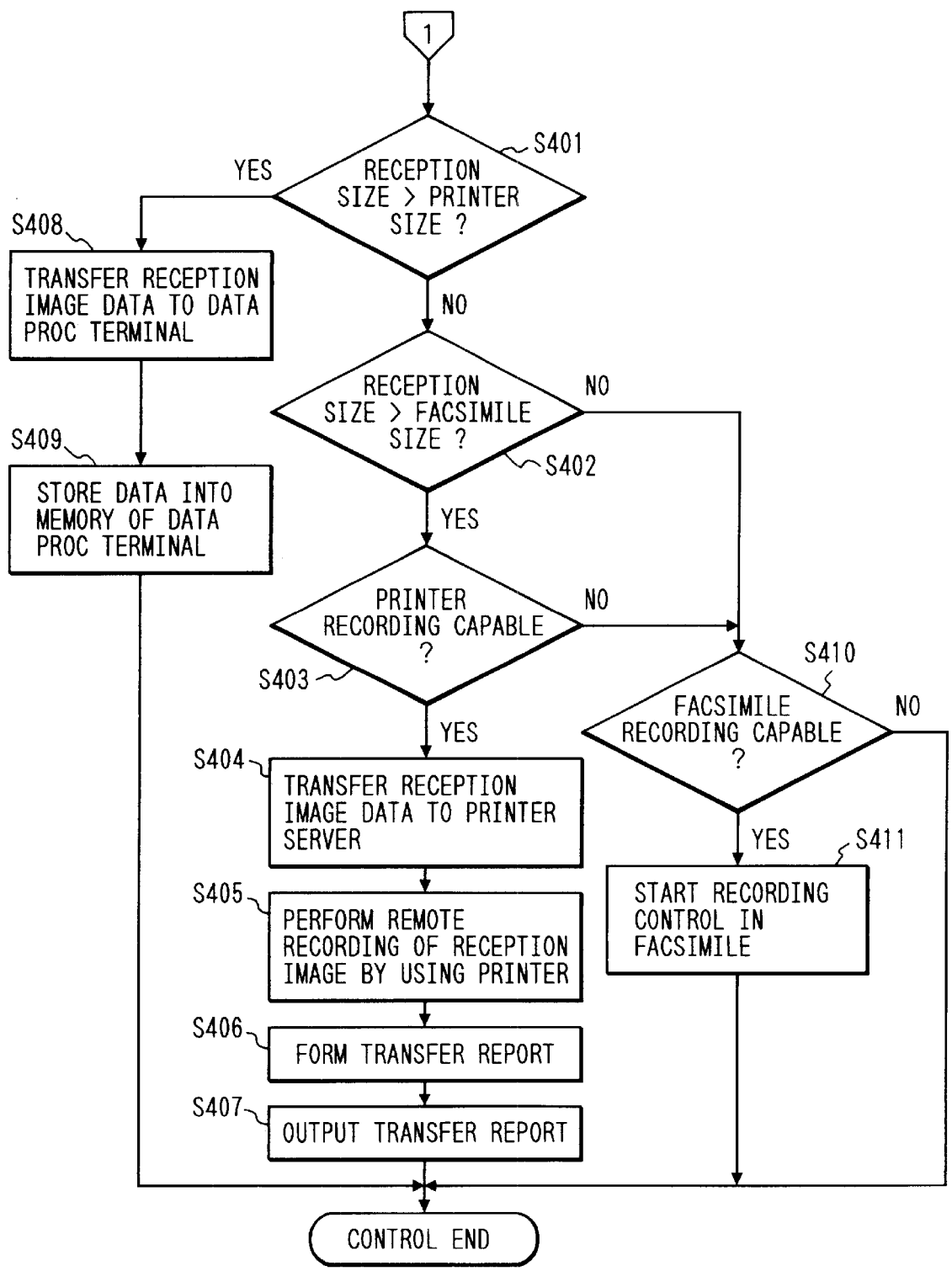

FIGS. 3 and 4 are flowcharts showing a reception control in the construction of FIG. 2 in the embodiment of the invention.

First, a recording ability of the printer 104 of the facsimile apparatus 201 is set (step S301). In the embodiment, since the recording ability of the facsimile apparatus 201 is set such that the maximum recording paper size is equal to A4 and the pixel density is equal to "Fine". Therefore, "A4" is set to a recording paper size Fs of the facsimile apparatus and "Fine" is set to a pixel density Fd. Such set data is stored in the data memory 109.

Subsequently, to set the recording ability of the printer 205 connected onto the LAN, address data on the LAN of the printer server 204 and printer 205 connected to the LAN is asked to the server machine 203 which is performing an address control (S302). In the embodiment, an ask control of the address data is executed by a method whereby an address data request is transmitted from the facsimile apparatus 201 to the data processing terminal 202 and the data processing terminal 202 obtains address data of the server machine 203 through the LAN and notifies to the facsimile apparatus 201. It is assumed that the control to obtain the address data on the LAN is executed by softwares which have previously been installed in the data processing terminal 202 and server machine 203.

After the address data of the printer server 204 was obtained, a recording ability of the printer 205 connected to the printer server 204 is asked (S303). In the embodiment, since the recording ability of the printer 205 is such that the maximum recording paper size is set to A3 and the pixel density is set to 600 dpi, "A3" is set into a recording paper size Ps of a peripheral equipment and "600 dpi" is set into a pixel density Pd and are stored in the data memory 109. It is assumed that the control to obtain the recording ability of the printer 205 connected to the LAN is executed by softwares which have previously been installed in the data processing terminal 202 and printer server 204.

Subsequently, an image size which can be handled by the data processing terminal 202 connected to the facsimile apparatus 201 is set (S304). The image size which can be handled by the data processing terminal 202 denotes an image size in which image data can be processed by an application software installed in the data processing terminal 202. In the embodiment, it is assumed that an application software of the CAD is installed and the maximum image size is equal to A2 and a pixel density is equal to 1200 dpi. "A2" is set to an image size Cs of the data processing terminal and "1200 dpi" is set to a pixel density Cd and they are stored into the data memory 109. The image can be recorded to a recording medium such as a floppy disk or the like from the data processing terminal 202 and can be also recorded by an external plotter or the like. It is also possible to construct in a manner such that desired process and edition are executed by the data processing terminal 202 and the resultant image data is recorded and outputted to a recording paper by a printer of the facsimile apparatus 201, the printer 205, or the like.

After the image size of each apparatus was set, a reception state of the communication line 116 is monitored (S305). When there is a reception from the communication line 116, a reception control is started (S306).

After the start of the reception control, a check is made to see if a transfer control of the image data received to the data processing terminal 202 and the printer 205 on the LAN can be performed or not (S307). In the embodiment, the permission or inhibition of the transfer control is judged by checking whether the data processing terminal 202 can receive the data from the facsimile apparatus 201 or not.

When it is judged in step S307 that the transfer control cannot be executed, in order to output the received image by the facsimile apparatus, the recording ability of the facsimile apparatus is declared to a transmitter as a reception ability in accordance with the preset Fs and Fd. The declaration of the reception ability of the facsimile apparatus is transmitted to the transmitter while setting the main scan size of A4, main scan pixel density of 8 dots/mm, and sub scan pixel density of 7.7 dots/mm into a DIS frame as a standard frame of the ITU-T recommendation.

When it is judged in step S307 that the transfer control can be performed, the reception ability is declared on the basis of the preset Ps and Pd indicative of the recording ability of the printer 205 connected to the LAN and the preset Cs and Cd indicative of the image size which can be handled by the data processing terminal 202. In the embodiment, the declaration of the reception ability is performed by the DIS frame as a standard frame of the ITU-T recommendation and an NSS frame as a non-standard frame. In case of the communication between the own apparatuses, the reception control is executed by the reception ability declared by the NSS frame.

First, the main scan size of A3, main scan pixel density of 16 dots/mm, and sub scan pixel density 15.4 dots/mm are set into the DIS frame on the basis of the recording ability of the printer 205 and are transmitted to the transmitter (S309). Although the pixel density of the printer 205 is equal to 600 dpi, since the pixel density which can be declared by the DIS frame is such that the main scan pixel density is equal to 16 dots/mm and the sub scan pixel density is equal to 15.4 dots/mm (corresponding to 400 dpi), it is assumed that the setting is executed within such a range. Subsequently, the main scan size of A2, main scan pixel density of 1200 dpi, and sub scan pixel density of 1200 dpi are set into the NSS frame on the basis of the image size of the data processing terminal 202 and are transmitted to the transmitter (S310).

After completion of the declaration control of the reception ability, the reception control is continued and the received images are sequentially stored into the image memory of the facsimile apparatus 201 (S311).

After the reception, an output control of the received images is started. First, the image size of the received images is set (S312). The image size is set by setting a main scan width of the received image to Rs and a pixel density to Rd.

After the image size of the received images was set, a selection control of an output destination of the received images is executed. First, the received image size is compared with the recording ability of the printer 205 connected to the LAN (S401). When the received image size exceeds the recording ability of the printer 205, in order to process the received images by the data processing terminal 202, the processing routine advances to step S408. The received image data is transferred to the data processing terminal 202 connected to the facsimile apparatus. In the data processing terminal 202, the transferred image data is stored into a memory such as a hard disk or the like in the data processing terminal 202 (S409). The processing routine is finished.

When it is judged in step S401 that the reception size is equal to or less than the recording ability of the printer 205, step S402 follows. A check is made to see if the image data can be recorded by the facsimile apparatus 201 or not. When the received image size exceeds the recording ability of the facsimile apparatus 201, an output control of the received images is executed by the printer 205 connected to the LAN.

In case of performing the output control by the printer 205 connected to the LAN, a check is first made to see if the printer 205 can output the received image or not (S403). As for a judgment about whether the received image can be outputted or not, a printer output request and the received image size are notified from the facsimile apparatus 201 to the data processing terminal 202 and the received image size is transmitted from the data processing terminal 202 to the printer server 204 via the LAN. The printer server 204 judges whether the received image size from the data processing terminal 202 is the size at which the recording can be at present performed or not. The judgment result is transmitted to the data processing terminal 202 and is notified to the facsimile apparatus 201. It is also assumed that the output capable judgement control is executed by the softwares which have previously been installed.

In step S403, when it is judged that the images can be outputted by the printer 205, the received images are transferred from the facsimile apparatus 201 to the printer server 204 through the data processing terminal 202 (S404). The printer server 204 converts the reception image data received through the LAN to a predetermined format and sequentially transfers to the printer 205 and executes a recording control of the received image data (S405).

When a remote print control is executed by the printer 205 on the LAN, an output control of a transfer report is performed. The transfer report output control is executed by forming data of the printer such as name and position of the printer which was transferred in accordance with a predetermined format (S406) and by performing the recording control by the printer control unit of the facsimile apparatus 201 (S407).

When it is judged in step S403 that the recording control cannot be performed by the printer 205 and when it is judged in step S402 that the reception size doesn't exceed the ability of the facsimile apparatus 201, the output control of the received images is executed by the facsimile apparatus 201. When the printer control unit of the facsimile apparatus 201 judges that the recording cannot be performed, the recording control is stopped and a substitution reception is set and the reception control is finished. When it is judged in step S410 that the recording can be performed by the facsimile apparatus 201, the recording control is started (S411). After completion of the recording control, the reception control is finished. When the printer 205 connected to the LAN cannot output in step S403, the image processes such as reduction and the like are executed to the received image data and the recording control is executed by the facsimile apparatus 201.

In the embodiment described above, although the construction such that the facsimile apparatus 201 is connected to the LAN and the received image data is transferred to the printer 205 on the LAN has been used, the invention is not limited to such a construction.

For example, it is also possible to use a construction such that the printer 205 is directly connected to the data processing terminal 202 connected to the facsimile apparatus 201. The data processing terminal 202 is not necessarily connected to the LAN.

In the embodiment, although one printer 205 has been connected to the LAN, the invention is not limited to such a construction.

For example, it is also possible to construct in a manner such that a plurality of printers are connected and the maximum recording ability is selected from the recording abilities of the plurality of printers and is declared as a reception ability.

In the case where the apparatus has a plurality of printers, the printer that is optimum to the reception image size is selected and a remote print can be also performed. When the number of pages of the received images is large, a printer of a higher speed can be also selected.

Further, by analyzing the reception data such as a received NSF frame or the like, a printer to output is selected and the received image data can be also printed by a desired printer on the transmission side.

In the embodiment, although the transfer report has been outputted in the case where the remote print control was performed, the invention is not limited to such a construction.

For example, reception data such as a received NSF frame or the like is analyzed and a reception notification mail or the like is transmitted to each user via the LAN and a transfer notification can be also performed.

The combination of the image sizes which can be handled by the facsimile apparatus, printer, and data processing terminal in the embodiment is not limited to the combination mentioned above.

For instance, the image size which can be handled by the data processing terminal can be also eliminated. A size other than the regular sizes can be also designated. Although the reception ability has been declared by the DIS frame and NSS frame, in case of communicating in an own company mode, it is also possible to declare in a unique frame.

Although the embodiment has been described with respect to the operation in the ordinary reception, a similar control can be also executed at the time of a polling reception. In this case, it is assumed that the reception ability is declared by the DTC frame and NSC frame of the ITU-T recommendation.

According to the embodiment mentioned above, image data higher than the ability which can be handled by the recording unit which the apparatus inherently has can be also handled. After the image data was fetched to the data processing terminal, some processes are executed to the image data and the processed data can be also outputted.

As described above, according to the invention, in the case where the image size that can be handled by the data processing terminal exceeds the reception image size which has previously been provided for the image communication apparatus such as facsimile apparatus or the like, the maximum image size of the data processing terminal is declared as a reception ability. Therefore, the image data exceeding the communication ability which the facsimile apparatus has previously had can be communicated.

Further, according to the invention, in the case where the image size of the received image data exceeds the image size which can be outputted by the recording unit provided for the image communication apparatus such as a facsimile apparatus or the like, the received image data is transferred to the data processing terminal. Therefore, the image data which cannot be outputted by the recording unit provided for the image communication apparatus can be outputted. The recording control can be performed by using the recording apparatus that is optimum for the received image. A reception recording control can be performed without causing a deterioration of the picture quality due to the execution of the image conversion control such as a reduction control or the like.

[Second Embodiment]

In the foregoing first embodiment, the facsimile apparatus is connected to an LAN 206 through the data processing terminal. In the second embodiment, which will be explained hereinlater, the facsimile apparatus is directly connected to the LAN 206 through the interface unit 112.

Figure 5:
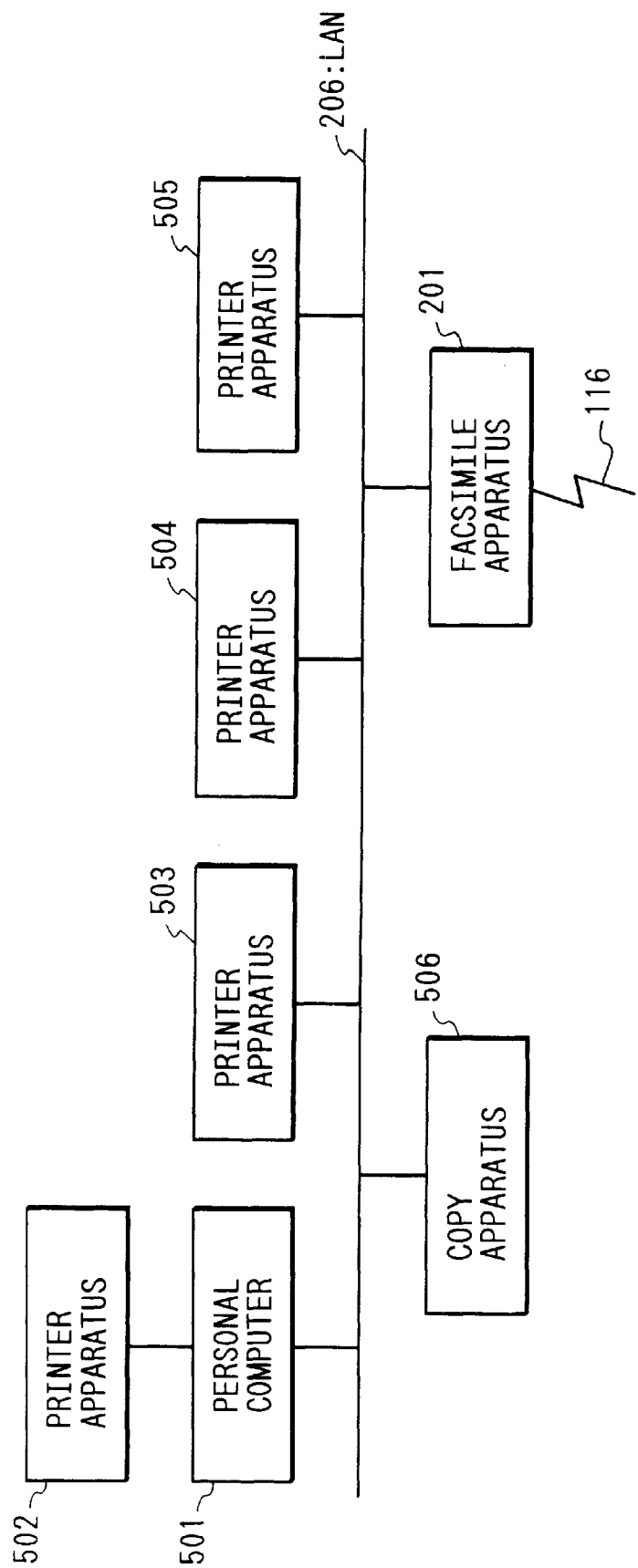

FIG. 5 is a diagram showing an example of a network construction in which the facsimile apparatus of the embodiment is connected through the interface unit 112.

Reference numeral 201 denotes the facsimile apparatus in the embodiment. The facsimile apparatus 201 transmits and receives data through the communication line 116.

Reference numeral 501 denotes a personal computer which can perform a formation of a document, figure, or the like.

Reference numerals 502 to 505 denote printer apparatuses such as laser beam printers or the like for recording a document formed by the personal computer 501, data received via the LAN 206, or the like.

Reference numeral 506 denotes a copying apparatus for performing an edition to an original read from a scanner of an own apparatus or an image received through the LAN 206 as necessary and for recording the edited image data.

Reference numeral 206 denotes the LAN (Local Area Network). Various equipment are connected through the LAN 206.

Figure 6:
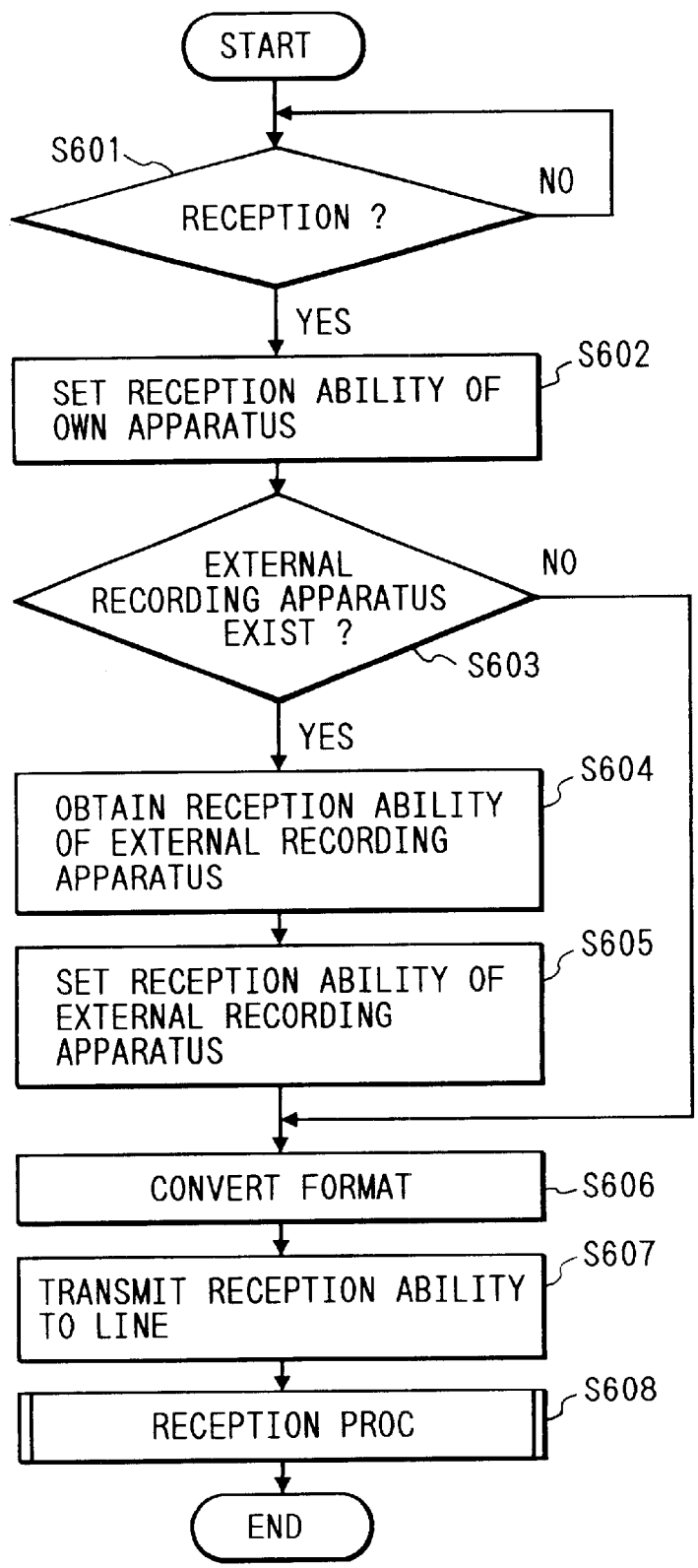

The operation according to the construction of FIG. 5 will now be described. FIG. 6 is a flowchart showing the details of a reception control of the facsimile apparatus 201 according to the construction of FIG. 5.

First, a check is made to see if there is a reception through the communication line 116 or not (S601). If NO, the apparatus waits for a reception. When there is a reception, a recording ability such as paper size, resolution, and the like which can be outputted by the printer 104 of the facsimile apparatus 201 itself is set into the data memory 109 (S602).

A check is made to see if an external recording apparatus has been connected through the I/F unit 112 or not (S603). When it is judged that no external recording apparatus is connected, the recording ability of the facsimile apparatus 201 held in the data memory 109 in step S602 is converted to the format that can be transmitted to the communication line 116 (S606) and is transmitted by the communication line 116 (S607).

A procedure of the ordinary reception will now be described hereinbelow (S608).

When it is judged in step S603 that the external recording apparatus is connected through the I/F unit 112, the output ability such as output-capable paper size, resolution, and the like of the external recording apparatus (printer apparatuses 502 to 505 and copying apparatus 506 in FIG. 5) is inquired to each equipment and is obtained (S604). The output ability held in the data memory 109 in step S602 and the output ability of the external recording apparatus obtained in step S604 are set into the data memory 109 (S605). However, in the case where a plurality of external recording apparatuses are connected, the data of the apparatus having the highest output ability is set.

In step S605, the reception ability held in the data memory 109 is converted to the format that can be transmitted to the communication line 116 (S606) and is transmitted to the communication line 116 (S607).

A procedure for the ordinary reception is executed after that (S608).

The output ability held in the data memory 109 has been converted to the format that can be transmitted to the communication line 116 in step S606 shown in FIG. 6. However, when the reception ability is set into the data memory 109 in steps S602 and S605, the output ability can be also converted to a format that can be transmitted to the communication line 116.

Although the second embodiment has been described above with respect to the case where the other recording apparatuses are directly connected to the facsimile apparatus via the interface as an example, the invention is not limited to such a case. For instance, the recording apparatuses can be also connected through the other apparatuses such as printer apparatuses connected to the personal computer. The number and kinds of apparatuses connected are also not limited.

According to the embodiment described above, not only the reception ability of the facsimile apparatus itself but also the reception ability of the recording apparatus connected through the interface is also notified to the communication partner, so that a desired image can be recorded.

[Third Embodiment]

In the above second embodiment, after the reception, the output ability has been set to the data memory 109.

However, according to the third embodiment, the output ability can be also previously set.

Figure 7:
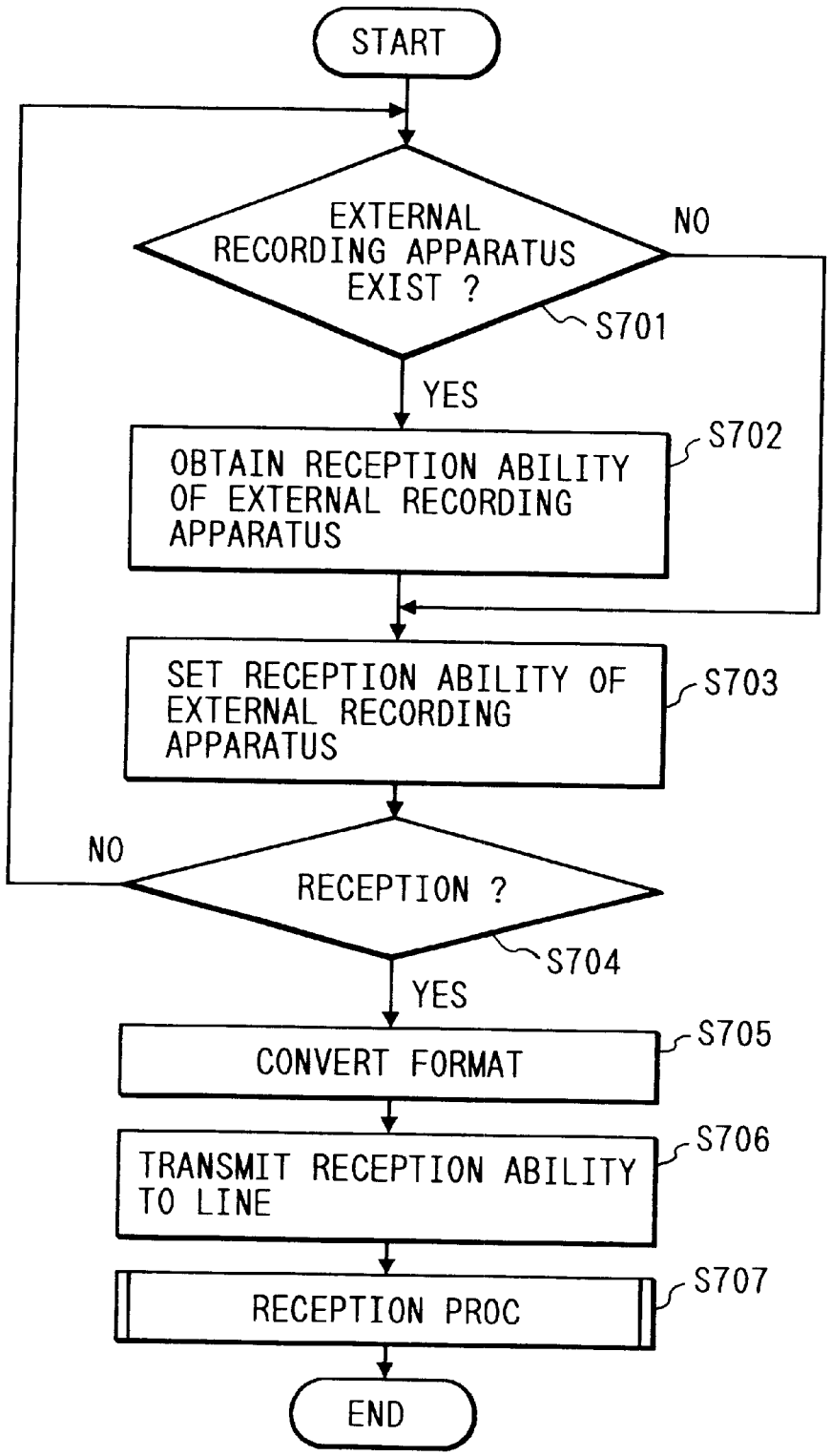

FIG. 7 is a flowchart showing the details of an operation control in the third embodiment.

First, a check is made to see if an external recording apparatus is connected through the I/F unit 112 or not (S701). When it is judged that the external recording apparatus is connected, the reception ability such as paper size, resolution, and the like which can be outputted by the external recording apparatus (printer apparatuses 502 to 505 and copying apparatus 506 in FIG. 5) connected is inquired to each equipment and is obtained (S702).

When it is judged in step S701 that no external recording apparatus is connected, only the recording ability of the facsimile apparatus 201 itself is set into the data memory 109 and, when it is judged that the external recording apparatus is connected, both of the output ability of the external recording apparatus obtained in step S402 and the recording ability of the facsimile apparatus 201 itself are set into the data memory 109 (S703). The highest output ability of the external recording apparatus is set in a manner similar to that mentioned above.

Subsequently, a check is made to see if there is a reception through the communication line 116 or not (S704). When there is no reception, the processes in steps S701 to S703 are repeated until the reception. When there is the reception, the reception ability held in the data memory 109 in step S703 is converted to the format that can be transmitted to the communication line 116 (S705) and is transmitted to the communication line (S706).

A procedure for the ordinary reception is subsequently executed (S707).

In step S705 shown in FIG. 7, the output ability held in the data memory 109 is converted to the format that can be transmitted to the communication line 116. However, when the reception ability is set into the data memory 109 in step S703, it can be also converted to the format that can be transmitted to the communication line 116.

According to the third embodiment as described above, a desired image can be also recorded as mentioned in the foregoing embodiment and the output ability is previously set into the data memory 109 before reception, so that an efficiency of the processes can be raised.

According to the second and third embodiments as described above, in addition to the ability which can be recorded by the recording unit of the facsimile apparatus, an ability that can be recorded by the recording apparatuses connected is notified to the communication partner. Therefore, even image data which is not included in the ability that can be recorded by the recording unit of the facsimile apparatus can be received at a high fidelity.

[Fourth Embodiment]

In the foregoing embodiments, the user doesn't select the equipment to which image data can be transferred from among equipment connected to the LAN. In the fourth embodiment, which will be explained hereinbelow, an equipment in which the transfer is permitted can be selected.

A construction of the facsimile apparatus is similar to that shown in FIG. 1. A network construction is similar to that shown in FIG. 5.

FIG. 8 is a diagram showing an example of a format of a table showing output abilities of apparatuses in the network which are stored in the data memory 109. Apparatus numbers are respectively sequentially allocated to the apparatuses connected to the LAN 206, for example, from the apparatus that is closer to the facsimile apparatus 201 and a recording ability of the printer 104 of the own apparatus is controlled as No. 00. As data which is controlled by such a table, there are an address on the network, a size of image that can be outputted, a resolution of the image that can be outputted, and the presence or absence of a color ability. A control to collect those data through the network is performed by a software installed in each apparatus. The facsimile apparatus of the invention declares the reception ability and transfers the image on the basis of the data in the table.

FIG. 9 is a diagram showing an example of a format of a control table to control the image data stored in the image memory 114. Such a control table is also stored in the data memory 109. Reference numeral 901 denotes a file number to identify the image; 902 a telephone number of a communication partner side; 903 the number of pages; 904 an image size; 905 a resolution; 906 a color image or not; and 907 an image storage address in the image memory 114. Those data has been stored in each memory area of the image memory 114.

Figure 10:
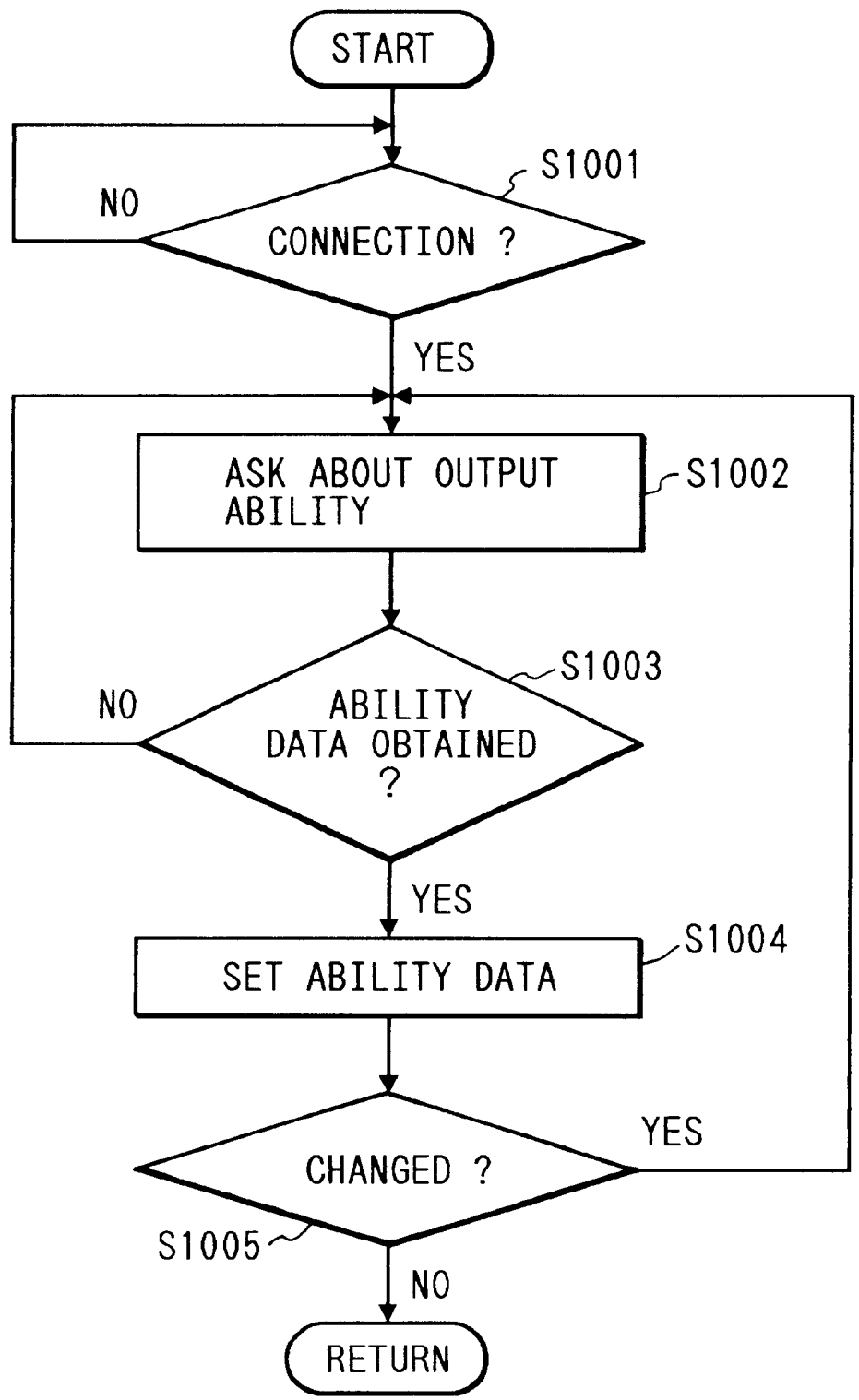

FIG. 10 is a flowchart showing a flow of the operations for asking and obtaining an output ability of an external apparatus connected to the LAN.

First in step S1001, a check is made to see if an external apparatus is connected through the I/F unit 112 or not. If YES, step S1002 follows and an output ability is asked to the external apparatus connected.

In step S1003, a check is made to see if the data of the output ability could be obtained or not. If NO, the process is repeated. If YES, step S1004 follows and the obtained ability data is set into the table shown in FIG. 8.

In step S1005, a check is made to see if there is a change in the connected external apparatus or not. In the case where after a connection table was pulled out, it is again connected or after a power source of the external apparatus was shut off, it is again turned on, it is judged that there is a change. When there is a change, the output ability is again asked and the processes are repeated.

It is assumed that the external apparatus whose output ability is collected is an apparatus whose output ability lies within a predetermined range and that, for example, it is installed in the same floor. It is also assumed that the recording ability of the printer 104 of the own apparatus has been preset in the table.

The output ability of the external apparatus set as mentioned above is stored into the data memory 109 as a table shown in FIG. 8 together with the recording ability of the printer 104 of the own apparatus.

In the embodiment, in the case where the image size and resolution of the reception data exceed the recording ability of the printer 104 of the own apparatus and the data cannot be recorded, the data is transferred to the connected external apparatus (which can output the reception data). In this case, in the embodiment, although the external apparatus which permits the transfer can be selected, its selecting method will now be described with reference to a flowchart of FIG. 11.

First in step S1101, a check is made to see if the display of the table indicative of the output ability of the external apparatus has been selected or not. When the display of the table is selected by a key selection of the console unit 106 or the like, the processing routine advances to step S1102. A list of table as shown in FIG. 12 is displayed on the display unit 107. When displaying, the stage of a cursor number is inverted and displayed, thereby enabling the present cursor position to be easily identified by the user.

A check is made in step S1103 to see if the "UP" key has been depressed or not. If YES, step S1104 follows and "1" is subtracted from the present cursor number, thereby allowing a one-upper stage to be inverted and displayed. In step S1105, a check is made to see if the "DOWN" key has been depressed or not. If YES, step S1106 follows and "1" is added to the present cursor number, thereby allowing a one-lower stage to be inverted and displayed.

In step S1107, a check is made to see if the "OK" key has been depressed or not. If YES, step S1108 follows. The external apparatus of the stage which is at present inverted and displayed is set as an external apparatus in which the transfer is permitted in accordance with the situation. An identifier as shown in FIG. 12 is added to the external apparatus which was set here, thereby making it possible to easily know that the external apparatus was set. The set apparatus is stored in the data memory 109.

In step S1109, a check is made to see if the "CANCEL" key has been depressed or not. If YES, in the case where the apparatus of the stage which is inverted and displayed is set, such a setting is invalidated, thereby inhibiting the transfer.

It is also possible to preset the apparatus number 00, namely, the printer 104 of the own apparatus as a printer whose output is permitted.

By repeating the processes as mentioned above, desired external apparatuses are sequentially selected. The selected external apparatuses are stored into the data memory 109.

Figure 13:
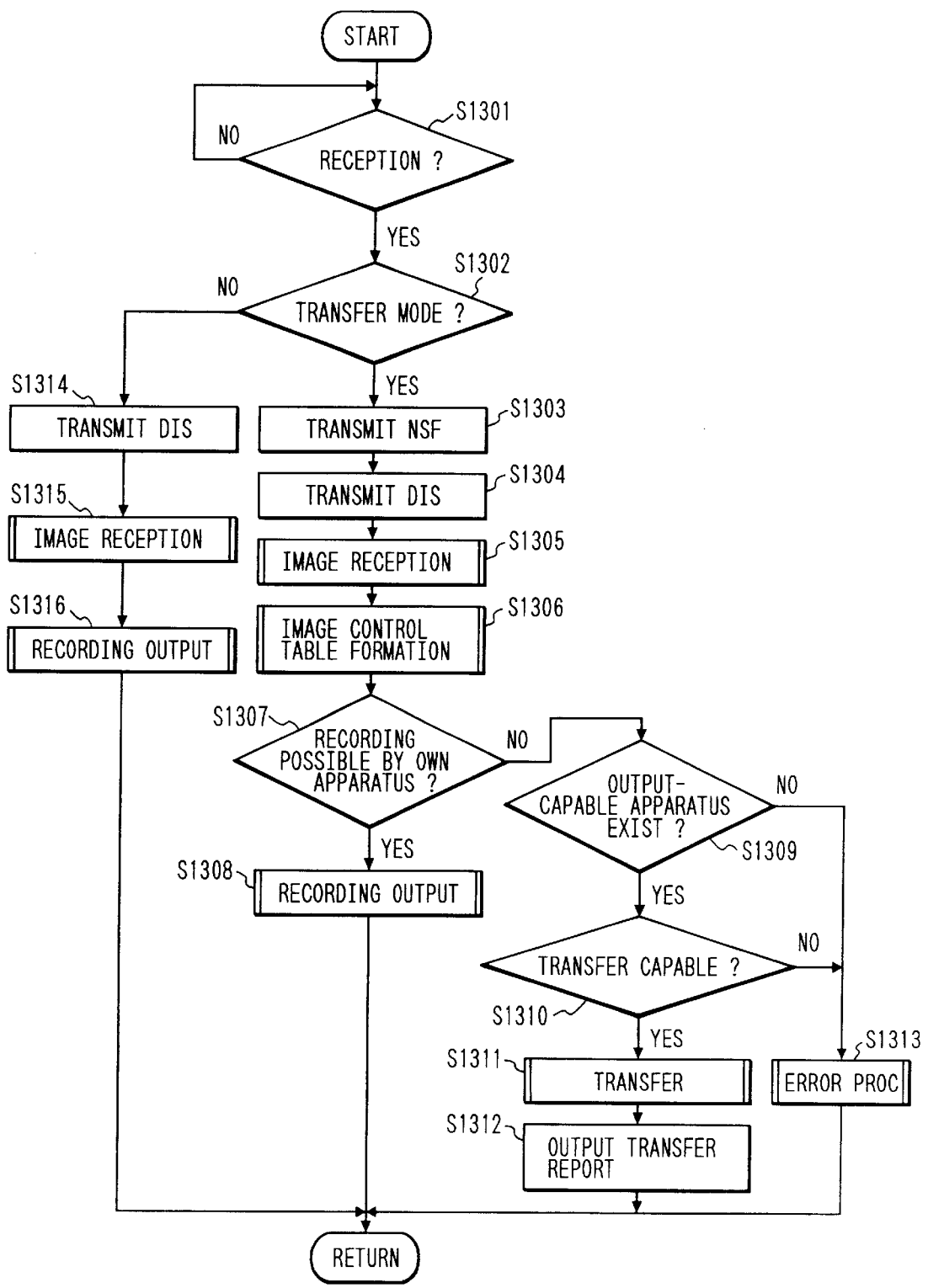

A flow of the operations which are executed until the image data is received from the partner side and is outputted will now be described with reference to a flowchart shown in FIG. 13.

Figure 11:
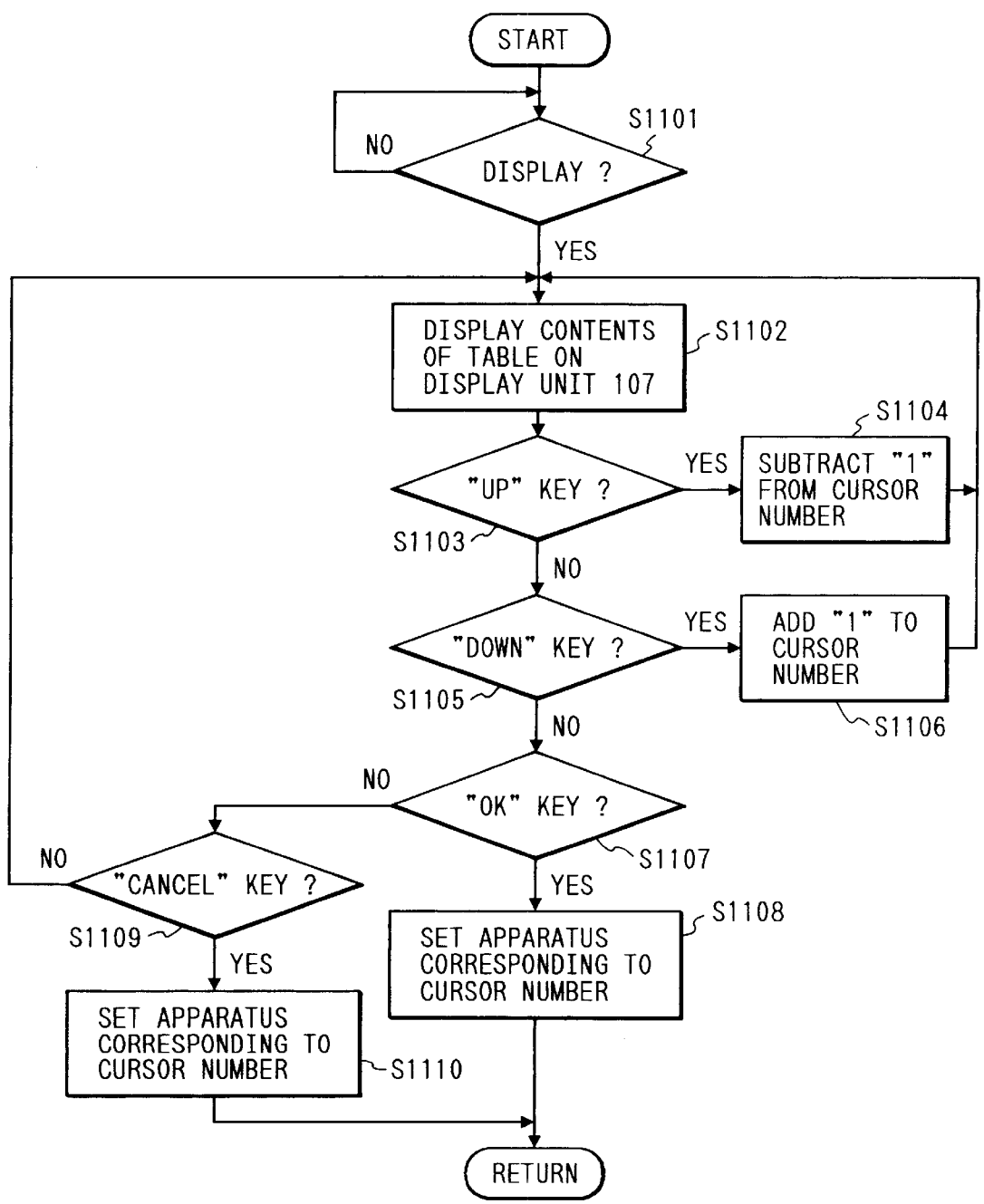

A facsimile apparatus of the embodiment has a transfer mode and a non-transfer mode. In the transfer mode, the reception data is transferred to the external apparatus selected in accordance with the situation. In the non-transfer mode, even if several external apparatuses were selected by the selecting operation as shown in the flowchart of FIG. 11, the reception data is not transferred but is recorded and outputted by the printer of the own apparatus.

First in step S1301, a check is made to see if there is a reception or not. If YES, step S1305 follows and a check is made to see if the transfer mode has been selected by a key operation of the console unit 106 or the like or not.

When the transfer mode is selected, in step S1303, the output ability of the external apparatus selected at present is extracted from the table and is included in an NSF (non-standard function) in a pre-procedure of the facsimile transmission and is notified to a communication apparatus on the partner side. Subsequently, in step S1304, the recording ability of the printer 104 of the own apparatus is notified to the partner's communication apparatus by a DIS (digital identification signal). When a mode in which the data is not recorded by the printer 104 of the own apparatus is set, the output ability of the apparatus of the smallest number among the apparatus numbers of the selected external apparatuses is notified by the DIS.

In step S1305, the image data is received. In step S1306, an image control table as shown in FIG. 9 is formed in correspondence to the reception data.

In step S1307, whether the reception data can be recorded and outputted by the recording ability of the printer 104 of the own apparatus is judged by comparing the contents of the image control table and the output ability table. A check is made to see if the image size and resolution of the reception data lie within a range in which the data can be recorded by the printer 104 or not. When the reception data lies within the recording-capable range, step S1308 follows and the recording and outputting of the reception data are executed.

When it is judged in step S1307 that the reception data cannot be recorded and outputted by the printer 104, namely, the image size and resolution of the reception data exceed the recording ability of the printer 104, step S1309 follows. A check is made to see if an apparatus which can output the reception data exists among the apparatuses selected as apparatuses in which the transfer is permitted in the output ability table or not. If YES, step S1310 follows. If NO, step S1313 follows and an error process is executed.

In step S1310, a check is made to see if the apparatus judged in step S1309 is in an output-impossible state because it is at present used or it is out of order or not. When the judged apparatus is in a state in which the data may be transferred to the external apparatus, step S1311 follows and the received image data is sequentially transferred to the judged external apparatuses. Subsequently in step S1312, a report such that it is possible to know by which external apparatus the received image data was outputted is recorded and outputted by the printer 104. The information stored in the image control table, the apparatus number of the external apparatus which outputted the data, the reception time, and the like are recorded to such a report and the resultant report is outputted.

In step S1302, when it is judged that the transfer mode is not set, this means that the non-transfer mode has been set. Even if the external apparatus whose transfer is permitted was selected by the foregoing selecting operation, the transfer is not performed but the apparatus operates as an ordinary stand-alone type facsimile apparatus. That is, the recording ability of the printer 104 of the own apparatus is notified by the DIS of the pre-procedure of the facsimile transmission in step S1314. The image data received in step S1315 is recorded and outputted by the printer 104 in step S1316.

According to the embodiment as mentioned above, various kinds of apparatuses on the network can be efficiently used.

When the external apparatus connected is changed, it is judged and the data of the output ability is again stored. Therefore, a situation such that in spite of the fact that the data was transferred on the basis of the output ability table, the reception data cannot be outputted by the external apparatus to which the data was transferred doesn't occur. The reception data can be certainly outputted by the external apparatus on the transfer destination side.

Since a desired apparatus can be selected from the external apparatuses connected, the transfer destination can be limited. For example, by inhibiting the selection of the external apparatus to which the user doesn't want to transfer the data, the data is not outputted by such an apparatus. In this instance, by selecting one specific external apparatus without selecting the printer of the own apparatus, all of the reception data can be also outputted by the specific apparatus. By selecting an output apparatus having an advanced function, an image of a high picture quality can be directly received without performing the reduction control and resolution conversion.

Since both of the transfer mode and the non-transfer mode are provided, it is possible to change from the console unit in a manner such that the communication apparatus functions as both of a facsimile apparatus of the network transfer type and an ordinary facsimile apparatus of the stand-along type as necessary.

In the case where the selected external apparatus is a personal computer, when there is a change or addition of a software installed, such a fact can be also notified from the personal computer to the facsimile apparatus.

In the embodiment, although a check is made to see if the image size and resolution of the reception data lie within the range of the output ability of the output unit of each apparatus or not, the invention is not limited to such a judgment. It is also possible to further judge whether color data can be outputted or not, thereby also enabling a color image to be received and outputted.

[Fifth Embodiment]

In the foregoing fourth embodiment, the facsimile apparatus having the scanner and printer has collected the output ability data of the external apparatuses in the network and notified to the partner side. However, the invention is not limited to such a construction. It is also possible to provide a communication server which doesn't have a scanner and a printer and to notify an output ability from the communication server.

Figure 14:
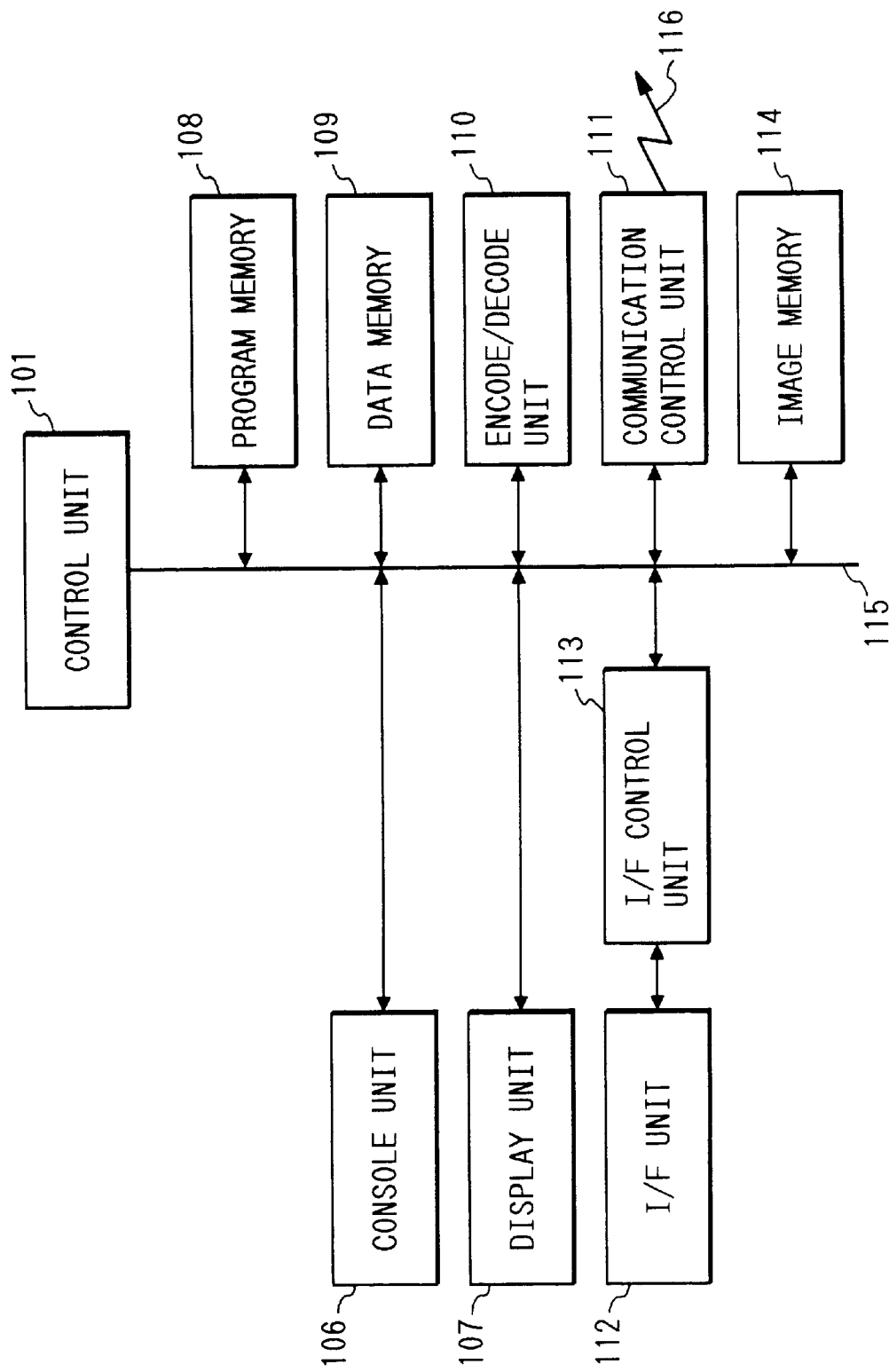
FIG. 14 is a block diagram showing a construction of a communication server according to an embodiment of the invention.

FIG. 14 is a block diagram showing a construction of the communication server in the fifth embodiment. The communication server is constructed by eliminating the scanner and printer from the facsimile apparatus of FIG. 1 and an explanation of each unit is omitted here.

Figure 15:
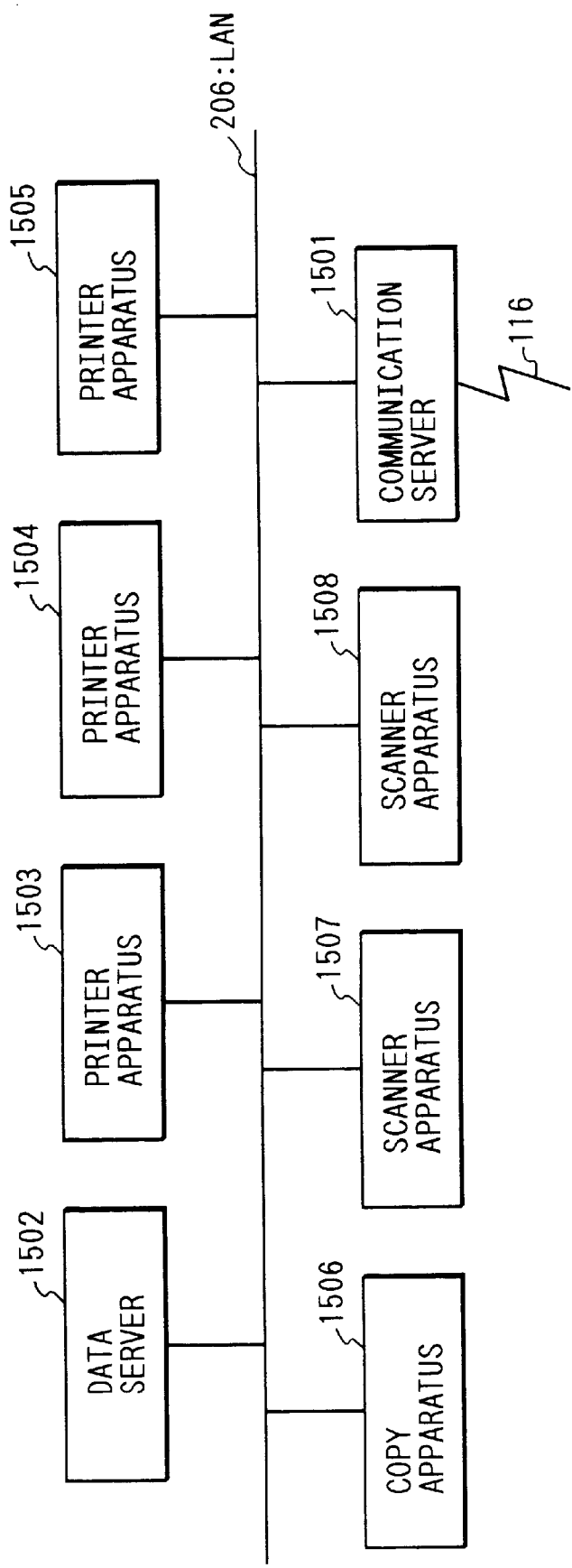

FIG. 15 is a diagram showing an example of a network construction in case of connecting the communication server shown in FIG. 14.

Reference numeral 1501 denotes a communication server in the embodiment. Data read from scanner apparatuses 1507 and 1508, data sent from a copying apparatus, a personal computer (not shown), or the like, and the like are transmitted or received via the communication line 116 by the communication server 1501.

Reference numeral 1502 denotes a data server for collecting output ability data of external apparatuses connected to the LAN 206 and controlling them.

Reference numerals 1503 to 1505 denote printer apparatuses such as laser beam printers or the like each for recording a document formed by a personal computer (not shown) or the like, data received via the LAN 206, or the like.

Reference numeral 1506 denotes a copy apparatus for editing an original read from the scanner of the own apparatus or an image received through the LAN 206 and recording.

Reference numerals 1507 and 1508 denote the scanner apparatuses each for reading the set original and outputting to an equipment on the LAN 206.

Figure 16:
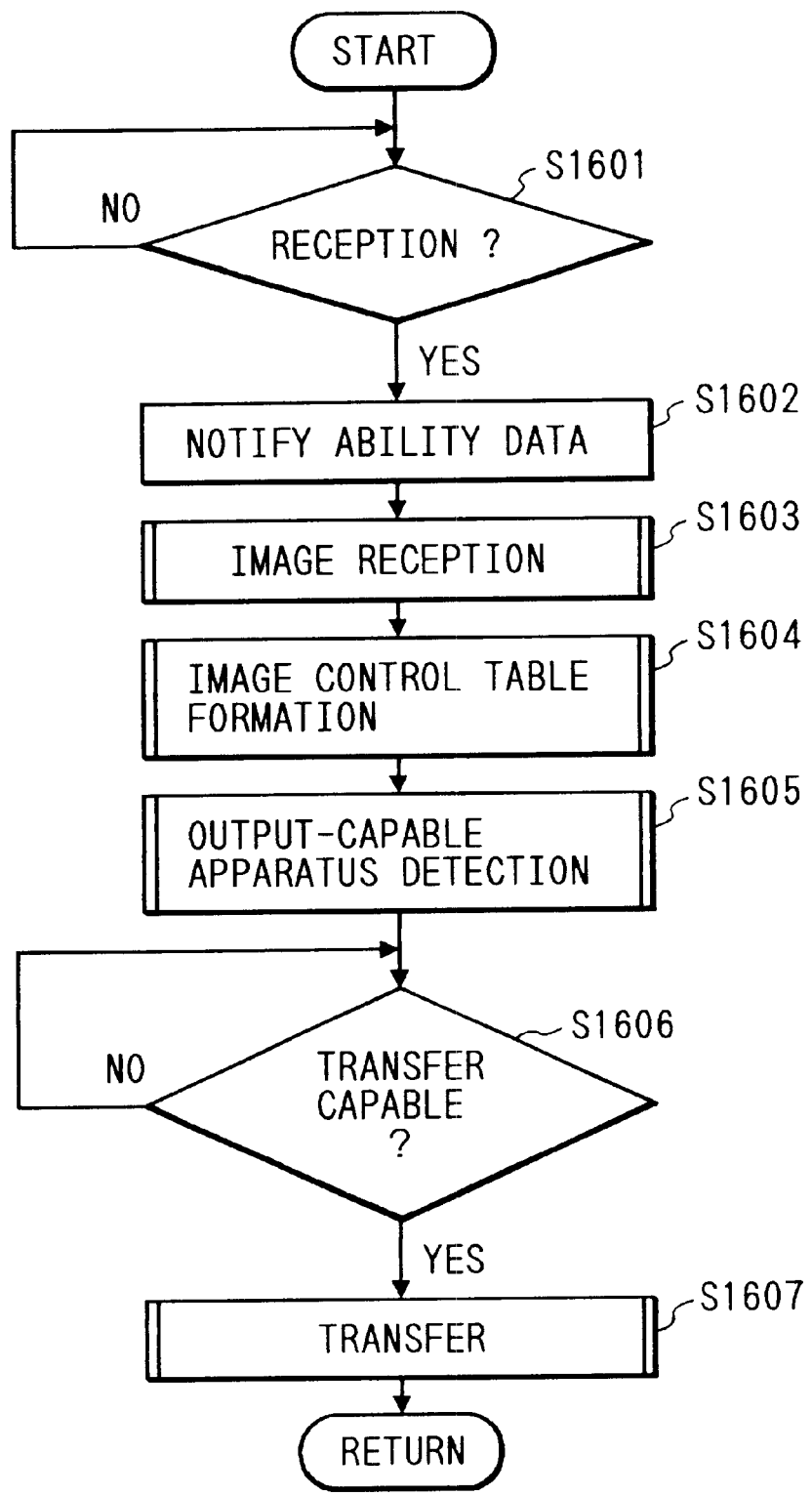

A flow of the operations in case of receiving data by the communication server 1501 and transferring will now be described with reference to a flowchart shown in FIG. 16.

First in step S1601, a check is made to see if there is a reception or not. When there is a reception, step S1602 follows and output ability data of the external apparatuses in the network is notified to the partner side by a pre-procedure of the facsimile transmission. The output ability data is controlled by the data server 1502 or can be also controlled by the data memory 109 of the communication server 1501. In both of the above control methods, a control table is formed and stored by the method as mentioned above and the external apparatus whose transfer is permitted is selected by the operator. When the connected external apparatus is changed, the output ability data is also rewritten as mentioned above. The highest ability data (image size, resolution, and the like) among the output ability data of the external apparatuses selected as mentioned above is notified to the partner's communication apparatus by, for example, the DIS (various functions can be also notified by the NSF).

In step S1603, the image data is received. In step S1604, the image control table as shown in FIG. 9 is formed in correspondence to the reception data.

In step S1605, the output-capable external apparatus is detected from the output ability table on the basis of the contents of the image control table. Subsequently, in step S1606, a check is made to see if the data can be transferred to the external apparatus detected in step S1605 or not. When the data cannot be transferred because the external apparatus is in use or the like, the data is transferred to another output-capable external apparatus or is held in the image memory 114. In step S1607, the data is transmitted to a transfer-capable external apparatus, thereby allowing the reception data to be outputted.

According to the fifth embodiment as mentioned above, the communication server notifies the output ability and transmits and receives the image data, thereby enabling the image data to be outputted by the various external apparatuses on the network.

Each function can be efficiently executed as mentioned above.

According to the fourth and fifth embodiments as described above, the data according to the output ability of a desired external apparatus can be received and outputted.

According to the invention, whether the transfer of the image data to the external apparatus is permitted or inhibited can be selected.

As described above, the equipment on the LAN can be efficiently used.

Although the present invention has been described with respect to the preferred embodiments, the invention is not limited to the foregoing embodiments but many modifications and variations are possible within the spirit and scope of the appended claims of the invention.

What is claimed is:

1. A data communication apparatus comprising:
communicating means for communicating data through a communication line with a communication partner;
connecting means for connecting one or more external terminals; and
control means for controlling said communicating means such that function information regarding a data processing function of said data communication apparatus and function information regarding a data processing function of the external terminals connected to said connecting means are informed to the communication partner through the communication line,
wherein said control means controls so as to inform the function information to the communication partner, in advance of receiving data to be processed, and
wherein said data communication apparatus is controlled in accordance with its capability or the capability of the external terminals so that the data received by said communicating means can be processed in an appropriate manner either by said data communication apparatus or by the external terminals connected by said connecting means.

2. An apparatus according to claim 1, wherein the function information is an image size and a resolution of image data that can be processed in said data communication apparatus and/or the external terminals.

3. An apparatus according to claim 2, further comprising:
transfer means for transferring the data received by said communicating means to the external terminals connected to said connecting means,
and wherein said transfer means transfers the data in the case where the image size and resolution of the data received by said communicating means exceeds a function of said data communication apparatus.

4. An apparatus according to claim 3, further comprising:
notifying means, in the case where the transfer by said transfer means was executed, for notifying such a fact to the user.

5. A data communication apparatus comprising:

receiving means for receiving data;

visualizing means for visualizing the data received by said receiving means;

discriminating means for discriminating whether or not said visualizing means can visualize the data received by said receiving means;

connecting means for connecting one or more external terminals;

transfer means for transferring the data received by said receiving means to the external terminals connected to said connecting means in the case where said discriminating means discriminates that said visualizing means cannot visualize the data received by said receiving means; and notifying means, in the case where the transfer by said transfer means was executed, for notifying such execution to a user.

6. An apparatus according to claim 5, wherein said visualizing means outputs the data received by said receiving means onto a recording paper.

7. An apparatus according to claim 5, wherein said notifying means notifies the user of said execution by outputting report information.

8. An apparatus according to claim 7, wherein said notifying means adds information to the report information representing the external terminal as a destination to which the data has been transferred by said transfer means.

9. A data communication apparatus comprising:

communicating means for communicating data through a communication line with a communication partner;

connecting means for connecting one or more external terminals via an interface different from the communication line;

selecting means for selecting at least one external terminal connected through said connecting means, on the basis of a manual instruction; and control means for controlling said communicating means such that function information regarding a data processing function of the external terminal selected by said selecting means is informed to the communication partner through the communication line.

10. An apparatus according to claim 9, wherein the function information is an image size and a resolution of image data that can be processed in the external terminal.

11. An apparatus according to claim 9, further comprising:

transfer means for transferring the data received by said communicating means to the external terminals connected through said connecting means.

12. An apparatus according to claim 11, further comprising:

notifying means, in the case where the transfer by said transfer means was executed, for notifying such a fact to a user.

13. A data communications apparatus comprising:

receiving means for receiving data through a communication line from a communication partner;

connecting means for connecting one or more external terminals;

transfer means for transferring the data received by said receiving means to the one or more external terminals connected through said connecting means;

selecting means for selecting whether the transfer by said transfer means is executed, on the basis of a manual instruction; and informing means for informing the communication partner through the communication line by said receiving means of function information regarding a data processing function of the one or more external terminals, wherein said transfer means transfers, in a case where it is selected by said selecting means that the transfer is executed, the data received by said receiving means to the one or more external terminals;

wherein said informing means informs the communication partner of the function information of the one or more external terminals in a case where it has been selected by said selecting means that the transfer by said transfer means is executed; and wherein said informing means does not inform the communication partner of the function information of the one or more external terminals in a case where it is not selected by said selecting means that the transfer by said transfer means is executed.

14. A data communication apparatus comprising:

communicating means for communicating data through a communication line with a communication partner;

connecting means for connecting a plurality of external terminals;

memory means for storing a plurality of function information regarding a data processing function of each of the external terminals connected to said connecting means; and control means for controlling said communicating means such that function information regarding a data processing function of said data communication apparatus and function information stored in said memory means are informed to the communication partner through the communication line.

15. An apparatus according to claim 14, further comprising transfer means for transferring the data received from the communication partner by said communicating means in accordance with contents of the data.

16. An apparatus according to claim 14, further comprising:

detecting means for detecting a change of an external terminal connected by said connecting means; and modifying means for modifying a contents of said memory means in a case where said detecting means detected the change of the external terminal.

17. A method for controlling a data communication apparatus, said method comprising:

a communicating step of communicating data with a communication partner;

a first informing step of informing the communication partner through a communication line of function information regarding a data processing function of the data communication apparatus in advance of receiving data to be processed;

a second informing step of informing the communication partner through the communication line of function information regarding a data processing function of an external terminal connected to the data communication apparatus in advance of data to be processed; and a controlling step of performing control such that an output destination of process-target data received from the communication partner in said communicating step is selected according to contents of the data.

18. A method for controlling a data communication apparatus, said method comprising:

a communicating step of communicating data with a communication partner;

a discriminating step of discriminating whether or not the data communication apparatus can visualize the data received from the communication partner in said communicating step;

a transferring step of transferring the data received from the communication partner to one or more external terminals, in a case where it was discriminated in said discriminating step that the data communication apparatus cannot visualize the received data; and a notifying step of notifying a user that the received data cannot be processed, in a case where a transfer in said transferring step was executed.

19. A method for controlling a data communication apparatus, said method comprising:

a communicating step of communicating data with a communication partner through a communication line;

a selecting step of selecting at least one external terminal connected to the data communication apparatus through an interface different from the communication line, on the basis of a manual instruction; and an informing step of informing the communication partner through the communication line of function information regarding a data processing function of the external terminal selected in said selecting step.

20. A method for controlling a data communication apparatus, said method comprising:

a receiving step of receiving data from a communication partner;

a transferring step of transferring the data received from the communication partner through a communication line, to an external terminal connected to the data communication apparatus;

a selecting step of selecting whether or not the transfer in said transferring step is to be executed, on the basis of a manual instruction; and an informing step of informing the communication partner through the communication line by said receiving step of function information regarding the processing of data of the external terminal, wherein said transferring step executes the transfer in a case where said selecting step selects that the transfer in said transferring step is to be executed;

wherein said informing step informs the communication partner of the function information of the external terminals in a case where it has been selected by said selecting step that the transfer by said transfer means is executed; and said informing step does not inform the communication partner of the function information of the external terminals in a case where it is not selected by said selecting step that the transfer by said transfer step is executed.

21. A method for controlling a data communication apparatus, said method comprising:

a communicating step of communicating data with a communication partner;

a storing step of storing into a memory of said data communication apparatus a plurality of function information regarding a data processing function of each of a plurality of external terminals connected to said data communication apparatus;

a first informing step of informing the communication partner through a communication line of function information regarding a data processing function of said data communication apparatus; and a second informing step of informing the communication partner through the communication line of the function information stored in said memory.

22. A computer readable program, stored in a storage medium, for controlling a data communication apparatus, said program comprising:

a communicating step of communicating data with a communication partner;

a first informing step of informing the communication partner through a communication line of function information regarding a data processing function of the data communication apparatus in advance of receiving data to be processed;

a second informing step of informing the communication partner through the communication line of function information regarding a data processing function of an external terminal connected to the data communication apparatus in advance of receiving data to be processed; and a controlling step of performing control such that an output destination of data received from the communication partner in said communicating step is selected according to the contents of the data.

23. A computer readable program, stored in a storage medium, for controlling a data communication apparatus, said program comprising:

a communicating step of communicating data with a communication partner;

a discriminating step of discriminating whether or not the data communication apparatus can visualize the data received from the communication partner in said communicating step;

a transferring step of transferring the data received from the communication partner to one or more external terminals, in a case where it was discriminated in said discriminating step that the data communication apparatus cannot visualize the received data; and a notifying step of notifying a user that the received data cannot be processed, in a case where a transfer in said transferring step was executed.

24. A computer readable program, stored in a storage medium, for controlling a data communication apparatus, said program comprising:

a communicating step of communicating data with a communication partner through a communication line;

a selecting step of selecting at least one external terminal connected to the data communication apparatus through an interface different from the communication line, on the basis of a manual instruction; and an informing step of informing the communication partner through the communication line of function information regarding a data processing function of the external terminal selected in said selecting step.

25. A computer readable program, stored in a storage medium, for controlling a data communication apparatus, said program comprising:

a receiving step of receiving data from a communication partner;

a transferring step of transferring the data received from the communication partner through a communication line, to an external terminal connected to the data communication apparatus;

a selecting step of selecting whether or not the transfer in said transferring step is to be executed; and an informing step of informing the communication partner through the communication line by said receiving step of function information regarding the processing of data, wherein said transferring step executes the transfer in a case where said selecting step selects that the transfer in said transferring step is to be executed;

wherein said informing step informs the communication partner of the function information of the external terminals in a case where it has been selected by said selecting step that the transfer by said transfer step is executed; and wherein said informing step does not inform the communication partner of the function information of external terminals in a case where it is not selected by said selecting step that the transfer by said transfer step is executed.

26. A computer readable program, stored in a storage medium, for controlling a data communication apparatus, said program comprising:

a communicating step of communicating data with a communication partner;

a storing step of storing into a memory of said data communication apparatus a plurality of function information regarding a data processing function of each of a plurality of external terminals connected to said data communication apparatus;

a first informing step of informing the communication partner through a communication line of function information regarding a data processing function of said data communication apparatus; and a second informing step of informing the communication partner through the communication line of the function information stored in said memory.

* * * * *